United States Patent [19]

Bollen et al.

[11] Patent Number: 4,766,515
[45] Date of Patent: Aug. 23, 1988

[54] ELECTROSTATIC HOLDER

[75] Inventors: Romain H. Bollen, St. Trond; Jozef E. Mariën, Boechout; Valentin G. Wissels, Edegem, all of Belgium

[73] Assignee: Agfa-Gevaert N.V., Mortsel, Belgium

[21] Appl. No.: 100,420

[22] Filed: Sep. 24, 1987

[30] Foreign Application Priority Data

May 1, 1987 [EP] European Pat. Off. ........ 87200814.9

[51] Int. Cl.$^4$ ............................................. H01T 23/00
[52] U.S. Cl. .................................................... 361/234
[58] Field of Search .......................................... 361/234

[56] References Cited

U.S. PATENT DOCUMENTS 3,571,678 3/1971 Sezako et al. ...................... 361/234

Primary Examiner—L. T. Hix
Assistant Examiner—David Porterfield
Attorney, Agent, or Firm—William J. Daniel

[57] ABSTRACT

An electrostatic holder suitable for electrostatically adhering thereto paper and developed silver halide emulsion films, wherein said holder comprises in the following order:
(1) an electrically insulating member carrying the hereinafter described elements (2) to (5),
(2) an electrically conductive member acting as electrode,
(3) a dielectric layer having a dielectric strength of at least 150 kV.cm and a thickness in the range of 10 to 1000 μm,
(4) an electrically conductive member acting as electrode and having the form of a grid or electrically interconnected conductor strips, and
(5) a covering layer having a surface resistivity of at least $10^9$ ohm/square and a thickness of at most 100 μm, and wherein said interconnected conductor strips are grounded and put at a direct current potential difference with respect to said electrode (2).

14 Claims, 1 Drawing Sheet

ELECTROSTATIC HOLDER

DESCRIPTION

The present invention relates to a supporting means for improving the adhesion thereto of removable and positionable sheetlike materials.

The use of electrostatic attraction force to adhere particulate material known as toner particles to carrier particles and to a substrate carrying an electrostatic charge pattern is known from electrophotography.

In another application electrostatic force has been used for adhering sheet materials such as paper sheets to a platen used e.g. in plotters, photographic enlarger cameras or copiers and as drawing board.

In an embodiment of the last mentioned application an electrostatic attraction force is created at a surface of an insulator wherein conductors are arranged at a small distance from each other and neighbouring conductor strips are kept at a different direct current potential. Such embodiment is illustrated in the German Auslegeschrift No. 2 148,666 and in the Dutch periodical "elektuur", Mar. 1987, p. 60–61 in the article : "Elektrostatische Papierhouder".

According to the theory set forth in said article the electric field existing between neighbouring conductor strips induces by electrical polarization in a sheet material overlaying the insulating material dipole structures that are electrostatically attracted by the electrostatic charge present on the conductors. The attraction force is directly proportional to the potential difference between the conductors and the permittivity, i.e. dielectric constant, of the material to be attracted.

In the above embodiment it is essential that in order to protect the operating personel there is a good electrical insulation between the conductors and the material to be adhered to the platen containing the conductors since for sufficient electrostatic attraction a voltage of e.g. 1 to 3 kV has to be applied.

According to an alternative being also described in the above mentioned periodical at page 63. FIG. 7 a more safe arrangement has been constructed. In the alternative embodiment a layered platen structure is built wherein a common electrode is carried by an insulating support and said common electrode is separated by a dielectric layer from an electrode pattern of conductor strips that are electrically interlinked. The interlinked conductor strips are connected to one pole of a direct current voltage source and grounded, whereas the common electrode is connected to the other pole of the direct current voltage source. In that embodiment a direct current potential difference of 1000 to 1500V is applied between the electrodes. Such a voltage is obtained starting with an alternating current source in combination with a known cascade rectifier circuit, e.g. as described at page 63 in FIG. 8 of the above mentioned article.

According to the disclosure made in said article it is essential that the material, e.g. paper, to be adhered to the supporting means makes a galvanic contact, i.e. ohmic or electrically conductive contact, with the electrode strips that are grounded. It is said that the electrostatic attraction force in that embodiment is no longer the result of a dielectric displacement because the paper is arranged in an equipotential region. The attraction force should come only from an electrostatic charge that is built on the adhering material through charge transfer by galvanic contact with the conductor strips.

It has now been found experimentally by us that said galvanic contact is not a must and still sufficient electrostatic adhesion force can be obtained when the grounded conductors strips are covered with a layer having a particular thickness and surface resistivity.

It is an object of the present invention to provide a new supporting means, called herein electrostatic holder, for electrostatically adhering thereto sheetlike materials such as paper sheets and resin film materials coated with a hydrophilic colloid layer.

It is more particularly an object of the present invention to provide a viewing illuminator including a transparent supporting means for electrostatically adhering thereto developed silver halide emulsion films such as X-ray films for image inspection.

Other objects and advantages of the present invention will appear from the further description.

In accordance with the present invention a supporting means capable of electrostatically holding or adhering thereto paper and developed silver halide emulsion films is provided, wherein said means comprises in the following order:

(1) an electrically insulating member carrying the hereinafter mentioned elements (2) to (5), (2) an electrically conductive member acting as electrode, preferably forming a continuous equipotential region.

(3) a dielectric layer having a dielectric strength of at least 150 kV.cm and a thickness in the range of 10 to 1000 μm.

(4) an electrically conductive member acting as electrode and having the form of a grid or electrically interconnected conductor strips, and (5) a covering layer having a surface resistivity of at least $10^9$ ohm/square and a thickness of at most 100 μm, and wherein said electrically interconnected conductor strips are grounded and put at a direct current potential difference with respect to said electrode (2).

The electrostatic holder according to the present invention can have a flat or curved shape, e.g. is used in a flat platen, endless belt or cylindrical drum structure.

For example, the electrostatic holder according to the present invention is suited for use as a sheet holder in copiers, in enlarger cameras or process cameras used in graphic art reproduction, or on drawing boards to fix the paper thereto during writing or drawing.

A survey of process cameras suited for graphic art reproduction and wherein the present electrostatic holder can be used is given in: "Ilford Graphic Arts Manual" vol. I, by H. M. Cartwright, Ilford Limited, Ilford Essex. Great Britain (1st reprint 1962) p. 82–87, under the heading "Process Cameras" and "Gallery Cameras". In said cameras the electrostatic holder may serve to hold the sheet originals as well as the photographic materials whereon the originals are photographed.

The electrostatic holder according to the present invention is further suited for use in pen plotters also known as curve tracers, or as electrostatic holder in combination with tablets for contour definition of image portions, e.g. digitizer tablets, using an electrically energized grid that transforms contour coordinates in digitized signals that can be fed into a computer.

In a special embodiment the supporting means according to the present invention serves as electrostatic holder for developed photographic silver halide films. e.g. X-ray films, in a viewing illuminator. In said embodiment the supporting means is transparent for the viewing light used in the illuminator and has preferably an optical density not more than 0.2. This latter embodiment can be combined with the digitizer tablet for contour definition referred hereinbefore.

In the embodiment according to the present invention wherein the electrostatic film holder is transparent for viewing transparencies in a viewing box or on illuminator all its members (1) to (5) are sufficiently transmissive to visible light in order to be non-interfering with the image to be inspected. In that embodiment the electrode members (2) and (4) are made preferably of transparent conductive material, e.g. thinly vacuum deposited metal or metal oxide, e.g. cathode sputtered tin doped indiumoxide. Sufficient visual non-interference of the electrode member (4) can likewise be obtained by applying the conductor strips at a spatial frequency of at least 4 line pairs per mm, which is a spatial frequency that cannot be detected by the naked eye. More information on the subject of transparent conductive layers can be found in the Review Paper published in "Thin Solid Films, 102 (1983) 1–46—Electronics and Optics—by K. L. Chopra et al., Physics Department, Indian Institute of Technology, New Delhi 1110016 (India) under the title "Transparent Conductors—A Status Review, pp. 1–41.

Particularly suited electrically conductive elements serving as electrodes in a transparent electrostatic holder according to the present invention have a surface resistivity smaller than 1500 ohm/square and a thickness in the range of 0.1 to 1 $\mu$m and an optical density for visible light being not larger than 0.1.

A vacuum deposited metal or metal oxide film can be easily transformed into an electrode of electrically interconnected metal strips by photo-resist and etching techniques used in the art of micro-electronics.

When the electrostatic holder according to the present invention has no transparent character the electrodes can be substantially thicker than for the above defined vacuum deposited electrodes and may be made of thin metal sheets, e.g. of aluminum and copper and transformed into strips by a common etching technique used in the production of printed circuits.

The element (1) serving as supporting member for the electrode (2) is made of an electrically insulating material having preferably a specific resistivity of at least $10^{12}$ ohm.cm. Suitable materials for that purpose are made of glass and/or resin film material, e.g. polycarbonate, poly(methyl methacrylate), polystyrene, polyvinyl chloride or polyester. For example, the support is a glass plate or polyethylene terephtalate film base having a thickness in the range of 0.1 to 10 mm.

A suitable material for forming dielectric interlayer (3) is preferably polyethylene terephtalate having a specific resistivity of $10^{17}$ ohm.cm and dielectric constant 3.2.

The thickness of the dielectric interlayer (3) is preferably in the range of 50 to 200 $\mu$m.

The covering layer (5) having the properties defined above may be firmly united to the electrode element (4) by a lamination procedure using e.g. an adhesive or glue of poor electrical conductivity, i.e. having a surface resistivity of at least $10^9$ ohm/square. An adhesive fulfilling such requirement is e.g. (meth)acrylic acid ethyl ester monomer that is polymerized in situ. Other suitable adhesives for that purpose are polyurethane adhesives formed by polyaddition of polyols and polyisocyanates.

According to an embodiment for the manufacture of the electrostatic holder according to the present invention two polyethylene terephthalate film sheets each at one side being coated with a transparent conductive layer, e.g. sputter-deposited indium tin oxide (ITO), are united to form a sandwich wherein one conductive layer is glued to the free polyester side of the other film sheet of which the conductive layer is etched to form the described conductive grid electrode.

According to another embodiment a polyethylene terephthalate film sheet is used that is coated at both sides with a conductive transparent layer and said film is glued with one of said conductive layers to an electrically insulating support, e.g. glass support, whereas the other conductive layer is etched to form the described grid electrode.

We like to stress that contrary to what can be derived from the above mentioned article in the periodical "elektuur" the obtaining of sufficient attraction force effected on an electrically polarizable material needs no galvanic or ohmic contact between the striplike electrode and the material to be adhered.

In the electrostatic holder according to the present invention the direct current voltage may be applied at constant level all the time or fluctuating.

An unidirectional, i.e. direct current (DC) voltage of 600V to 1500V between the grounded conductor strip electrode (4) and a common electrode (2) suffices to fix a developed and dry silver halide film of the X-ray recording type in vertical position against gravity to the present electrostatic holder. The higher the silver content of the developed film the better the adherence for a same voltage difference between the electrodes.

It has been found experimentally that the holding force is gradually diminishing during the maintaining of a constantly high voltage between the electrodes. An explanation for that phenomenon is not yet available.

It has also been found experimentally that an intermittent application of the direct current voltage between the electrodes is in favour of the maintaining of a high holding force exerted on the material to be adhered. By the fact that the electrode strips remain charged for a certain time after removal of the voltage, as is the case on charging a capacitor, an intermittent application of the unidirectional voltage will maintain a holding force that by proper voltage interruption does not change markedly.

It has been found that in the voltage range of 600 to 1500 volt a suitable voltage interruption operates at intervals of 10 s "on" and 10 s "off". On applying that procedure the holding force with respect to a 30 cm$\times$40 cm developed double-side coated X-ray film having a total coverage of silver metal corresponding with 8 g per m 2 was about 15 newton (N).

The invention is illustrated by means of the accompanying FIGS. 1 and 2.

Figure 1:
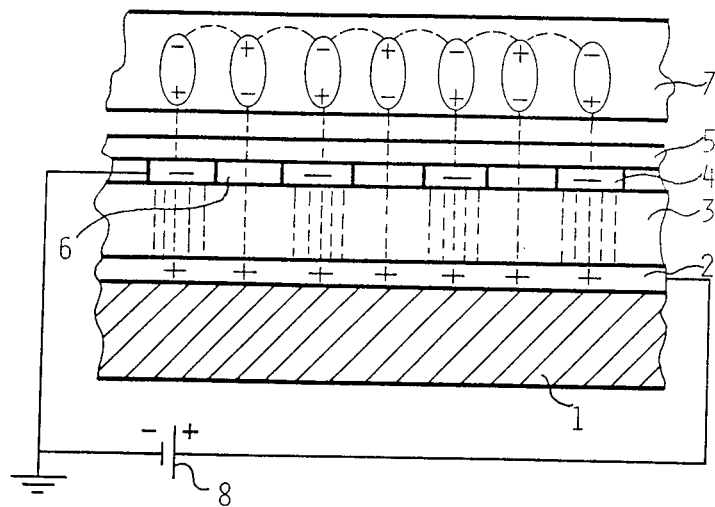
FIG. 1 is a schematic representation of an electrostatic holder according to the present invention showing the electrical field line flux produced therein and its polarizing influence on an electrically polarizable sheet material to be attracted.

The manufacture of the electrostatic holder represented in FIG. 1 starts with element 3 representing a glass fiber reinforced epoxy resin base having a thickness of 100 μm provided at both sides with a thin copper layer as is used in the production of printed circuits. One of the copper layers serves as a common electrode 2 and the other copper layer is etched to form therewith interconnected electrode strips 4. The electrode element 2 is glued to a polyvinyl chloride support sheet 1 having a thickness of 6 mm. The side of element 3 carrying the electrode strips 4 is laminated with an electrically insulating adhesive, e.g. polyester-urethane, (shown in the drawing as element 6) to a polyethylene terephthalate foil having a thickness of 15 μm and serving as covering layer 5.

According to a particularly suitable embodiment for the adherence of a paper sheet 7 in a pen plotter the electrostatic holder of FIG. 1 is operated with a direct current potential difference in the range of e.g. 500 to 2000V provided by current source 8 and maintained between the common electrode 2 and the electrode strips 4, the strips being arranged at a spatial frequency of 4 line pairs per mm.

According to a preferred embodiment in order to obtain a good electrical contact between the electrodes and the feed wires of the current source as terminals clamping screws making contact through an electrically conductive paste are used.

The dashed lines in FIG. 1 give a visual picture of the electric field lines produced between and above the electrode strips 4. The elliptical structures drawn in the paper sheet 7 illustrate zones wherein electrostatic polarization takes place whereby an electrostatic attraction force keeping the paper adhering to the electrostatic holder is created.

Figure 2:
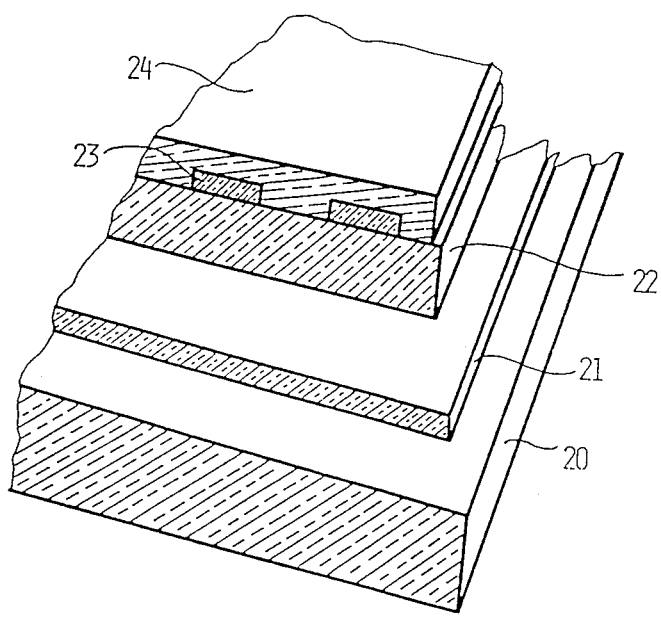
FIG. 2 is a cross-sectional perspective representation of a part of a transparent electrostatic holder according to the present invention suited for use in vertical position in an X-ray film viewing illuminator to attach thereto developed X-ray films by electrostatic force.

In FIG. 2 element 20 represents a glass platen being coated by vacuum sputtering technique with a 0.4 μm thick conductive layer 21 of tin doped indiumoxide having a specific resistance of $5 \times 10^{-4}$ ohm.cm. Layer 21 serves as common transparent electrode and is coated by lamination and an adhesive (not shown in the drawing) with a dielectric layer 22 being made of polyethylene terephthalate having a thickness of 50 μm. Onto said dielectric layer 22 a same conductive layer as described for element 21 is coated. Said conductive layer after being coated with a photoresist layer and exposure through a line-pattern mask was etched with sulphuric acid to produce a pattern of electrode strips 23, which strips at a border side are interconnected as shown in FIG. 7 of the already mentioned article of the periodical "elektuur".

To the electrode strips 23 a transparent covering layer 24 made of a composition curable by ultra-violet radiation is applied. Said composition has in dried cured state a thickness of not more than 100 μm and a surface resistivity of at least $10^9$ ohm/square. Suitable compositions for that purpose are mixtures of prepolymers of polyester acrylates and epoxy resin acrylates with monomers such as hexane diol acrylate, silicone diacrylate, aliphatic and aromatic urethane acrylates. Herein the monomers serve as solvent for the prepolymers so that after polymerization no solvents have to be removed by evaporation. The photopolymerization is started with a photoinitiator or mixture of photoinitiators, e.g. benzoin ethers, benzil ketals, acetophenone derivatives, ketoxime esters, benzophenone and/or thioxanthone derivatives.

The use of acrylated polyurethane oligomers in the production of coatings curable by ultra-violet radiation is described by Brian Martin in the journal "Radiation Curing" August 1986, pp. 4–16.

The transparent electrostatic holder as illustrated in FIG. 2 can be used in oblique or vertical position to attach thereto all kinds of developed photographic films that may still be wet on leaving a rinsing bath. The electrostatic holder is particularly useful for holding small format films, e.g. dental X-ray films, without loosing information that is characteristic for mechanical attachment with clamps. Furthermore the present holder allows the use of thinner films without problems with regard to wrinkling and curling. The use of thinner films has a particular advantage in that their storage takes less volume and consequently less room for storage. Thinner films, particularly when coated at both sides with a silver halide emulsion layer, so-called duplitized films, offer a definite gain in image-sharpness in X-ray recording with a pair of X-ray intensifying screens.

We claim:

1. A supporting means capable of electrostatically holding or adhering thereto paper and developed silver halide emulsion films, wherein said means comprises in the following order:
    (1) an electrically insulating member carrying the hereinafter mentioned elements (2) to (5),
    (2) an electrically conductive member acting as electrode,
    (3) a dielectric layer having a dielectric strength of at least 150 kV.cm and a thickness in the range of 10 to 1000 μm,
    (4) an electrically conductive member acting as electrode and having the form of a grid or electrically interconnected conductor strips, and
    (5) a covering layer having a surface resistivity of at least $10^9$ ohm/square and a thickness of at most 100 μm, and wherein said interconnected conductor strips are grounded and put at a direct current potential difference with respect to said electrode (2).

2. A supporting means according to claim 1, wherein the direct current potential difference is applied intermittently between said electrodes (2) and (4).

3. A supporting means according to claim 1, wherein the direct current voltage is in the range of 600 to 1500V.

4. A supporting means according to claim 1, wherein the direct current voltage is applied intermittently at intervals of 10 s "on" and 10 s "off".

5. A supporting means according to claim 1, wherein element (1) serving as supporting member for the electrode (2) is made of an electrically insulating material having a specific resistivity of at least $10^{12}$ ohm.cm.

6. A supporting means according to claim 1, wherein the dielectric interlayer (3) is made of polyethylene terephtalate having a specific resistivity of $10^{17}$ ohm.cm and dielectric constant 3.2.

7. A supporting means according to claim 1, wherein the thickness of the dielectric interlayer (3) is in the range of 50 to 200 μm.

8. A supporting means according to claim 1, wherein the covering layer (5) is firmly united to the electrode element (4) by a lamination procedure using an adhesive or glue of poor electrical conductivity.

9. A supporting means according to claim 1, wherein said means is transmissive to visible light in such a degree that its optical density is not larger than 0.2.

10. A supporting means according to claim 1, wherein the electrode members (2) and (4) are made of transparent conductive material.

11. A supporting means according to claim 1, wherein the electrode members are made of thinly vacuum deposited metal or metal oxide.

12. A supporting means according to claim 1, wherein the electrode member (4) is obtained by applying the conductor strips at a spatial frequency of at least 4 line pairs per mm.

13. A supporting means according to claim 1, wherein said means is arranged in a viewing illuminator for electrostatically holding developed silver halide emulsion films.

14. A supporting means according to claim 1, wherein said means is arranged in a copier, enlarger camera or process camera used in graphic art reproduction for electrostatically holding sheet originals and/or photographic sheet materials.

* * * * *